INVENTOR.
L. MERLE PIERCE
ATTORNEYS

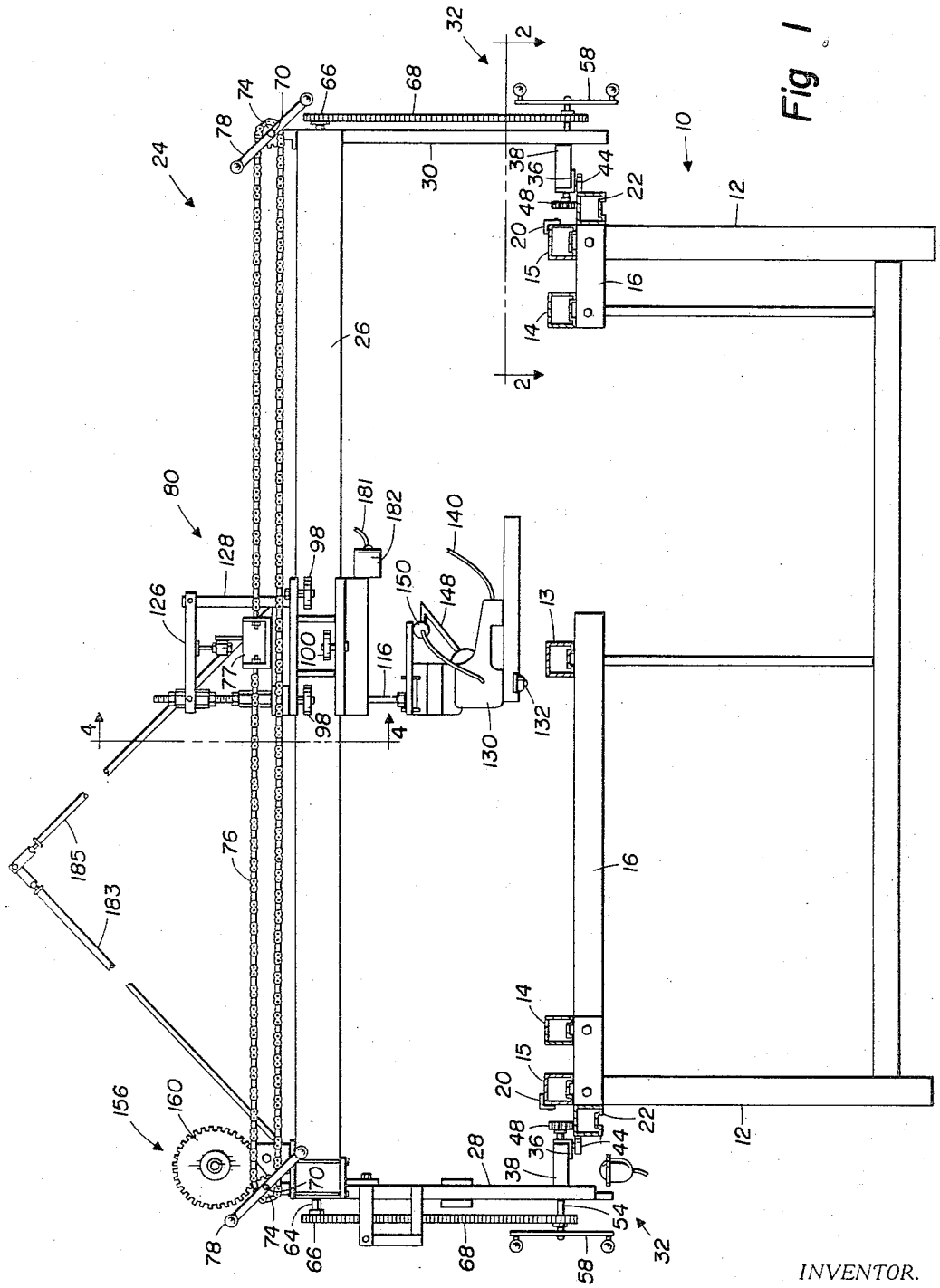

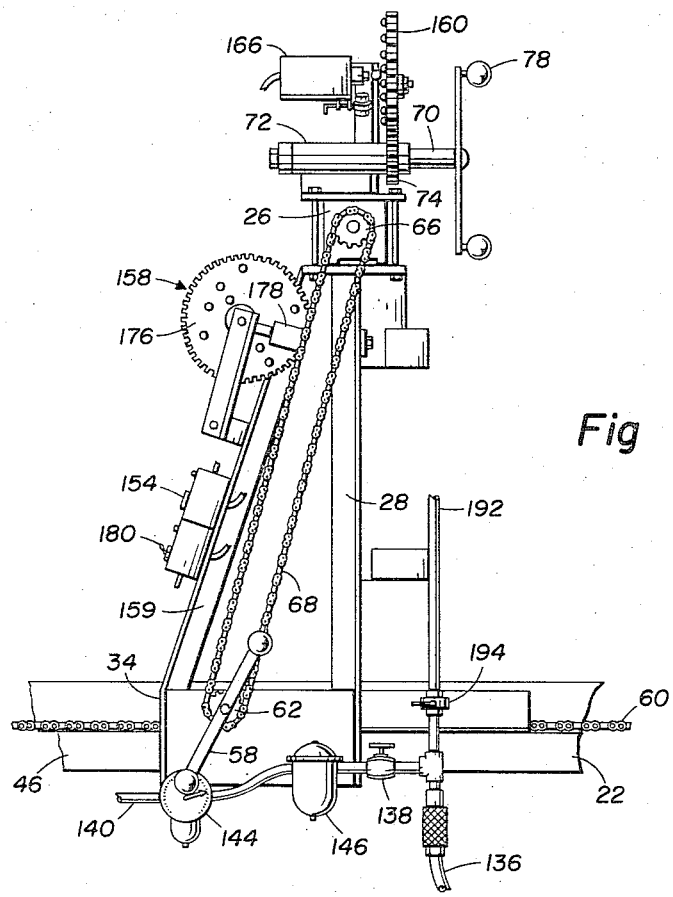
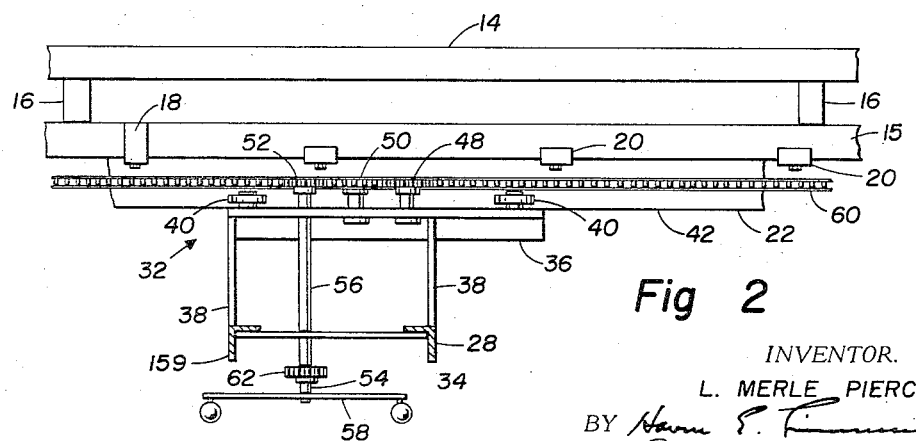

April 11, 1967    L. M. PIERCE    3,313,355
APPARATUS FOR SUPPORTING AND CONTROLLING
POWER FASTENER TOOLS AND THE LIKE
Filed June 4, 1964    5 Sheets-Sheet 4

INVENTOR.
L. MERLE PIERCE
BY
ATTORNEYS

United States Patent Office 3,313,355
Patented Apr. 11, 1967

3,313,355
APPARATUS FOR SUPPORTING AND CONTROLLING POWER FASTENER TOOLS AND THE LIKE
Leslie Merle Pierce, 1531 10th Ave. SW., Cedar Rapids, Iowa 52404
Filed June 4, 1964, Ser. No. 372,632
8 Claims. (Cl. 173—43)

This invention relates to an apparatus for handling and controlling power fastener tools and the like, and more particularly the invention relates to a semiautomatic apparatus for moving a power fastener tool accurately along a desired path, the tool that is carried being positionable at an infinite number of positions within the defined work area of the apparatus.

In certain industries, such as the construction industry, power fastener tools are commonly used by skilled laborers to improve the quality of their work and to increase their productivity. These tools are generally hand tools since the work is done on the job and is custom work. However, in the home building industry, for example, prefabrication of entire wall sections or panels is becoming more common. In prefabrication construction methods as performed by the large manufacturer, standardized panels and wall sections are produced in large quantities on a mass production basis. Since a considerable portion of building costs are labor, prefabrication results in lower priced homes. The custom built home, however, cannot be easily produced on a large scale, mass production basis, but labor savings can be accomplished if modular construction is utilized and wall sections and panels produced on a production basis rather than on the job site. This, of course, requires machines which can be used for factory production thereby assuring high quality construction and uniformity of the building components or panels produced. The well-known power hand fastener tools of various types are useful for shop production, but because of the size of some of the panels produced and because it is desirable to minimize further the labor costs, there is a need for simple, inexpensive machines which are suitable for this type of production. Moreover, use of individual hand power fastener tools does not necessarily produce uniformity in construction and high quality work.

In addition, panels of a variety of types and sizes must be produced and different operations must be carried out to produce each panel. It is desirable, therefore, that any apparatus used be versatile and capable of carrying out a specific operation at any point within the limits of the work area. With such an apparatus, the same basic apparatus could be used in the construction of all types of panels.

The apparatus also should be easily controlled by a single operator, and in order to justify its cost it must be capable of producing panels at a lower unit cost than is possible with the use of individual hand power tools.

It is therefore a principal object of my invention to provide an apparatus for handling and controlling power fastener tools and the like.

It is another object of my invention to provide an apparatus for handling and controlling power fastener tools and the like in which the tool can be positioned to perform its function at any point within the work area of the apparatus.

It is a further object of my invention to provide an apparatus of the type described to which a power driven stapler or the like can be attached and which will automatically actuate the stapler to drive staples into the work at spaced intervals along a predetermined path.

It is a still further object of my invention to provide an apparatus of the type described which is useful in the construction of building panels of all shapes and sizes within the size limits of the apparatus being used.

It is another object of my invention to provide an apparatus of the type described which will continuously drive staples or other fasteners accurately and efficiently, the apparatus of my invention accomplishing this object without complexity of design thereby keeping its cost to a minimum and within the reach of the small manufacturer.

These and other objects of my invention will be readily apparent from a consideration of the following description of a preferred form of the invention taken in connection with the accompanying drawings in which:

FIG. 1 is a side elevational view of my novel apparatus showing a power driven stapler attached thereto and the work table in section;

FIG. 2 is a top view of a portion of the apparatus taken along the line 2—2 of FIG. 1;

FIG. 3 is an elevational view of the front end of the machine, but not showing any of the power fastener tool attachments so as to simplify the end structure shown;

Figure 4:
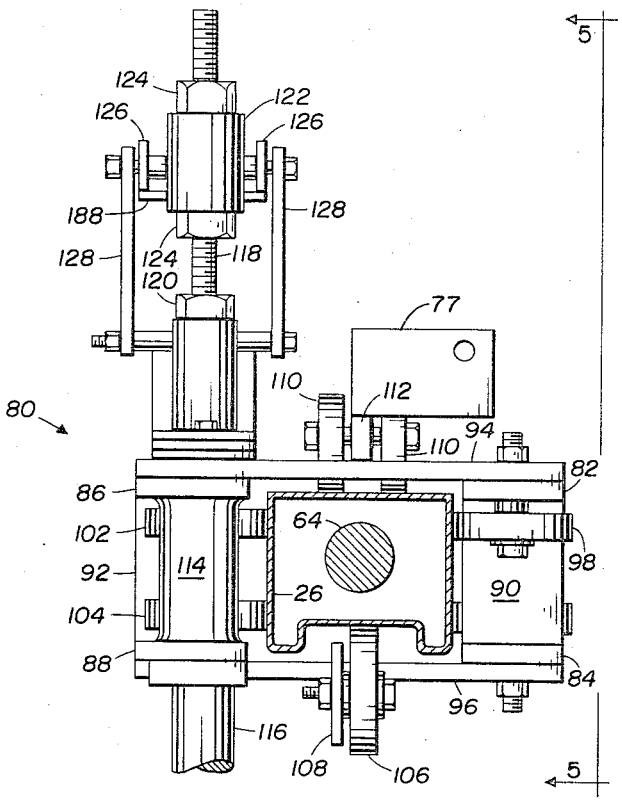
FIG. 4 is a detailed front view of the power tool carriage taken along the line 4—4 of FIG. 1.

My novel apparatus is comprised of several subassemblies including a work supporting table, a main carriage, and the attachment carriage to which is connected the desired tool such as a stapling device, nailer or the like. For the purpose of clarity, each of these sub-assemblies of the apparatus will be described separately.

The work supporting table

A work table, indicated generally by the reference number 10, is shown supported on a plurality of legs 12. The table 10 is provided with work supporting beams 13, 14 and 15 that rest on cross supports 16. The beam 13 is preferably affixed to the cross supports 16 in such a manner that the beam 13 can be moved laterally with respect to beams 14 in order to adjust their relative spacing and thereby provide support for smaller work pieces. Suitable means (not shown) such as clamps or other devices can be provided to lock the beam 13 in its selected position. The beams 14 and 15 are preferably fixed, and beams 15 have adjustable guide members 18 which can be moved to any desired position along the beams 15 and thereby position the work longitudinally of beams 15. The outermost work supporting beams 15 are provided with lugs 20 which serve as guides to position the work laterally of beams 15 and assure that it is squarely positioned on the table 10. The inside edges of beams 14 can also be used as guides if the work has depending members which can be positioned against these edges. With this construction, a large or small panel or other piece upon which the work is to be performed can be properly positioned and held in any desired place within the work area. Once the beam 13 and guides 18 are locked in the desired position, work can be performed consecutively on any number of panels of the same size. This will, of course, result in a substantial saving in time and thus reduce the overall labor cost particularly where a large quantity of panels are being manufactured.

Rigidly affixed to the legs 12 and cross supports 16 at the outermost edges of the work table 10 and below the level of beams 13, 14 and 15 are two parallel fixed beams 22. These beams 22 provide the supporting and guide surfaces for the main carriage assembly which will now be described.

*Main carriage assembly*

So that a power fastener tool can be moved longitudinally of beams 14 and 15 of the work table 10, there is provided a movable carriage indicated generally by the reference numeral 24. The structural elements of the carriage consists basically of a hollow main beam 26 extending above and transversely of beams 14 and 15 and supported at its ends on vertical uprights 28 and 30. Extending inwardly from the lower end of each of the vertical uprights 28 and 30 there is a drive assembly indicated generally by the reference numeral 32. As shown, each drive assembly 32 consists of an exterior angle member 34, which is secured directly to its corresponding one of vertical uprights 28 and 30, and an interior angle frame member 36, the exterior member 34 and the interior member 36 being connected by cross supports 38. A pair of wheels 40, turnable about horizontal axes, are affixed to each interior member 36. The wheels 40 engage the top surfaces 42 of the beams 22. A guide wheel 44, turnable about a vertical axis, is rotatably secured to the underside of each interior member 36 and engages the side 46 of the beams 22. Three small sprockets 48, 50 and 52 are rotatably supported on each member 36 and are turnable about horizontal aligned axes. Sprockets 48 and 50 are not powered and thus serve as idler sprockets. Sprocket 52 is driven by a shaft 54 that is turnable in a bearing sleeve 56 affixed to members 34 and 36. At its outer end, each shaft 54 has a crank 58 affixed thereto.

A roller-type chain 60 extends longitudinally along the top surface 42 of each beam 22 and engages the three sprockets 48, 50 and 52. The chain 60 is affixed at its ends to the beam 22 and passes beneath sprocket 48, around and over sprocket 50 and beneath drive sprocket 52. Since as has been indicated, a drive assembly 32 is provided at each end of the carriage 24, it is desirable that the drive sprocket 52 of each assembly be powered simultaneously from either side of the work table 10 by a single operator. Thus, I provide at the outer or crank end of each of the shafts 54 a second sprocket 62. A shaft 64 is turnably mounted inside the cross beam 26 and has a sprocket 66 at each end thereof in substantially the same vertical planes as the sprockets 62. A chain 68 interconnects the sprockets 66 and 62 at each end of the carriage 24, as shown. Thus, by turning either of the cranks 58, both sprockets 52 will be driven simultaneously and at the same speed, and the carriage 24 will travel smoothly along the top surfaces 42 of beams 22, rolling on wheels 40 and guided by the wheels 44.

*Attachment carriage*

To move the tool laterally of beams 13, 14 and 15 of work table 10, I prefer to provide a carriage 80 that is movable along the cross beam 26. The attachment carriage 80 is movable independently from the main carriage 24 and is driven by a simple chain drive arrangement. A shaft 70 is turnable in a suitable bearing sleeve 72 (FIG. 3) mounted at each end of beam 26. At corresponding ends of sleeves 72 shafts 70 are provided with aligned sprockets 74 interconnected by a chain 76 having its free ends affixed to a U-shaped bracket 77 on the carriage 80. Connected to each shaft 70 outboard of its sprocket 74 is a crank 78. Although two cranks 78 are not necessary, I prefer to provide one on each side so that all operations can be performed by a single operator on either side of the work table 10. Since the carriage 80 is secured to the chain 76 by virtue of bracket 77, the carriage 80 will be moved across the beam 26 as either of the cranks 78 is turned.

Figure 5:
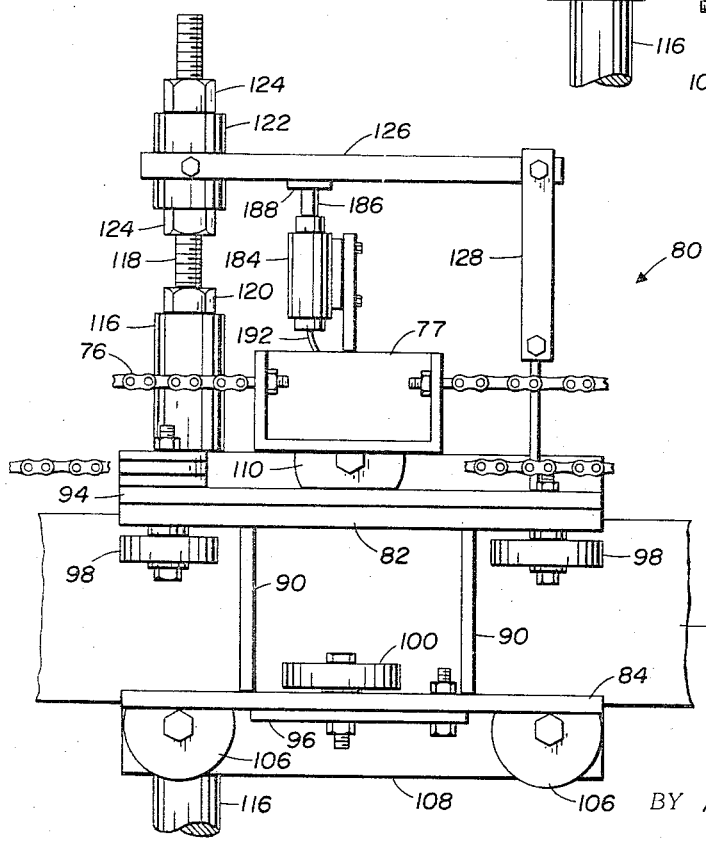
FIG. 5 is an enlarged elevational view along the line 5—5 of FIG. 4.

As best seen in FIGS. 4 and 5, the carriage 80 includes an upper plate 82 and a lower plate 84 positioned on one side of the beam 26 and an upper plate 86 and lower plate 88 on the other side of beam 26. The upper and lower plates 82 and 84 are joined by vertical connecting plates 90, and similarly, vertical connecting plates 92 join plates 86 and 88. To form a box-like structure around the beam 26, upper transverse connecting members 94 and lower transverse connecting members 96 interconnect upper plates 82 and 86 and lower plates 84 and 88, respectively. On the right side of the beam as viewed in FIG. 4, a pair of wheels 98 are mounted for rotatable movement about vertical axes on the upper plate 82. The wheels 98 are spaced apart, as shown, and positioned in between wheels 98 is a single wheel 100 which is mounted for rotatable movement about a vertical axis on the lower plate 84. On the other side of the carriage 80, a single upper wheel 102 is rotatably affixed to the upper plate 86 while a lower wheel 104 is similarly affixed to the lower plate 88. Another pair of wheels 106 are rotatable about horizontal axes and are affixed to a longitudinal vertical plate 108 depending from the transverse members 96. The wheels 106 engage the bottom surface of the beam 26 while a pair of wheels 110 engage the top surface. Wheels 110 are mounted for rotatable movement about a horizontal axis and are affixed to an upwardly projecting member 112 that is secured to the transverse members 94.

The assembly 80 forms a freely movable carriage which rolls on wheels engaging all four sides of the box-shaped beam 26. The carriage 80 permits a fastener tool attached thereto to be moved freely along the entire length of the beam 26 but because of its structure, the carriage will not allow movement of the fastener tool in any other direction. Thus, a power fastener tool can be accurately guided across the work surface.

If desired, a power fastener tool can be rigidly affixed to carriage 80, but I prefer to provide means whereby the tool can be raised above the work surface so that it can be more easily moved about and moved over any obstruction on the work surface. In order to permit raising and lowering of the tool, I provide a vertical sleeve 114 affixed between the upper and lower plates 86 and 88. Obviously, sleeve 114 could be affixed on the other side of the beam 26 if desired. A rod 116 is slidably mounted in the sleeve 114, and the upper end of rod 116 is internally threaded to receive a threaded member 118. A lock nut 120 secures the threaded member 118 to rod 116 and the upper end of the threaded member 118 passes through a bushing 122 and is secured thereto by a pair of lock nuts 124 one on each side of the bushing 122. Bushing 122 is pivotally secured to a pair of parallel spaced-apart arms 126 which are pivotally secured at their other ends to a bifurcated supporting bracket 128. Bracket 128 is pivotally affixed at its lower end to the upper transverse members 94 as shown. Thus, the rod 116 is free to move up and down in the sleeve 114, and when a power fastener tool 130 is connected to it, the weight of the tool 130 will cause it to rest on and follow the contour of the work surface. To reduce the friction and provide for easy movement of the power fastener tool 130 across the work surface, a pair of ball type casters 132, one on each side, can be secured to the power fastener tool 130 as indicated in FIG. 1. Thus, the power fastener tool 130 is free to move up or down along the work surface as the main carriage 24 is moved along beams 22 and/or as the attachment carriage 80 is moved along the beam 26.

The power fastener tool 130, which has been shown as a stapler, can be connected to the carriage 80 by removably securing the rod 116 thereto. Tool 130 can therefore easily be disconnected from the rod 116 if it is desired to change to a different type of tool. If all of the power tools which will be used have been modified to include the rod 116, the rod 116 itself can be disconnected from the threaded member 118 and the power fastener tool 130 and rod 116 removed as a unit. Note that the threaded member 118 provides for a vertical adjustment in the position of the power fastener tool 130 while still permitting it to move freely within a limited range.

The basic movable carriage assemblies that have been described are useful for the mounting of almost any power fastener tools such as those used in the building industry. For example, a nailer could be mounted on the carriage 80 as well as the stapler 130. Thus, the basic structure of the work table, main carriage and attachment carriage can be used to carry out many and varied operations.

*The control system*

The mechanical operating aspects of the apparatus have been described. In order to operate the tool at least semiautomatically, I prefer to provide an electrical control system (FIG. 8) and an air supply system (FIG. 9) which will control the power supply to the tool 130. I have shown for purposes of illustration and because of their common use a pneumatic stapler 130. There are, of course, other air-operated power fastener tools such as nailers. All of these tools require a supply of pressurized air which can be provided through a main air line 136 connected to a source of pressurized air (not shown). To assure that the proper pressure is provided to the tool 130, a pressure regulator 138 is preferably provided in a branch air line 140 that connects the tool 130 to the main line 136. The connection to the power fastener tool 130 is preferably made by a quick disconnect coupling (not shown) of any suitable type. This permits tools to be changed quickly and easily if desired. A pressure indicating gauge 144 and a filter and oiler 146 can be also provided in the branch air line 140.

The power fastener tool 130 shown for purposes of illustration is a model LE-7616 manufactured by Spot Nail, Inc., Rolling Meadows, Ill. This tool drives a fastener whenever the air pressure from line 140 is applied to one side of a driving piston (not shown) within the stapler, the supply of air being controlled by a pneumatically-actuated valve (not shown), also within the stapler, supplied with air through a bleed line 148. I therefore provide a solenoid valve 150 in the bleed line 148 which when energized will actuate the valve to supply air to the driving piston and thereby drive the staple or other fastener into the work piece. The operation of this type of stapler is more fully described in Goldring U.S. Patent No. 3,081,740.

Figure 6:
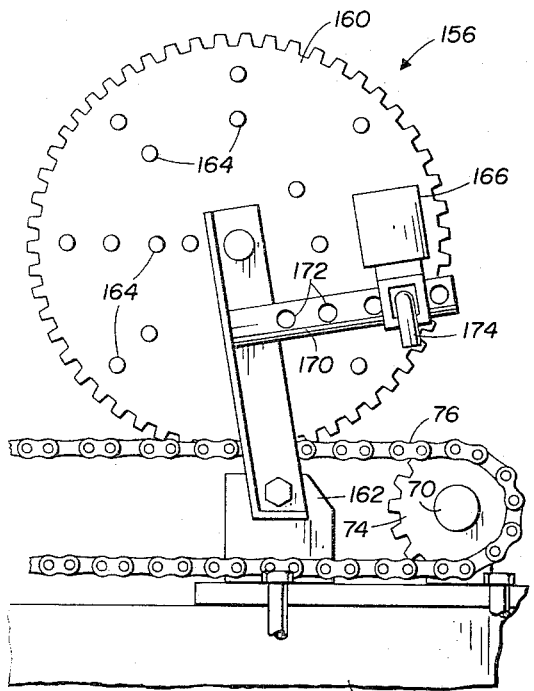
FIG. 6 is an enlarged view of the power fastener tool actuating or indexing mechanism.
Figure 7:
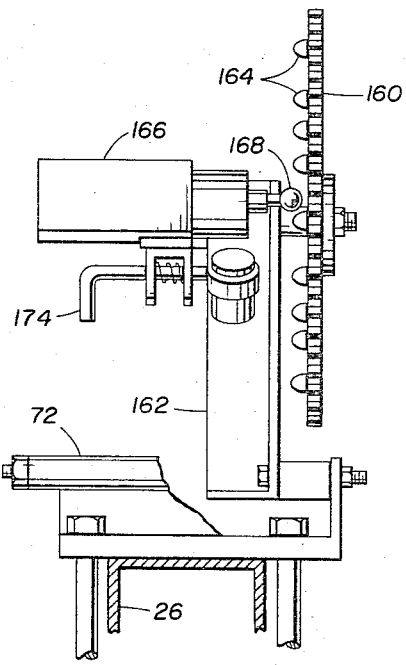
FIG. 7 is a view of the power fastener tool actuating mechanism looking at the mechanism from the right of FIG. 6.
Figure 8:
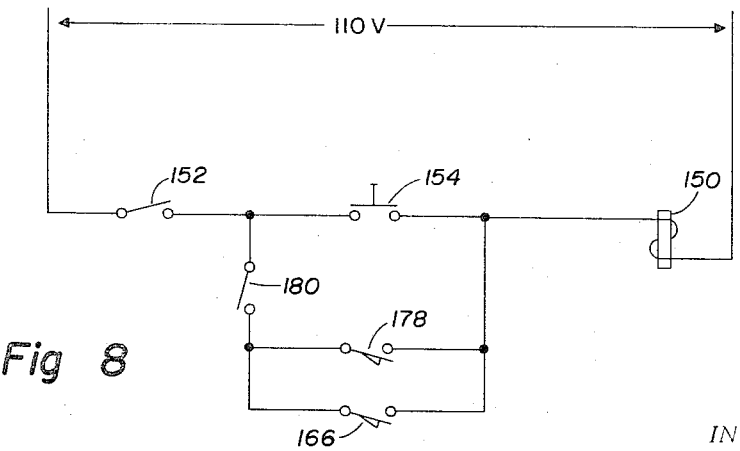
FIG. 8 is a schematic wiring diagram of the electrical control system for the machine.
Figure 9:
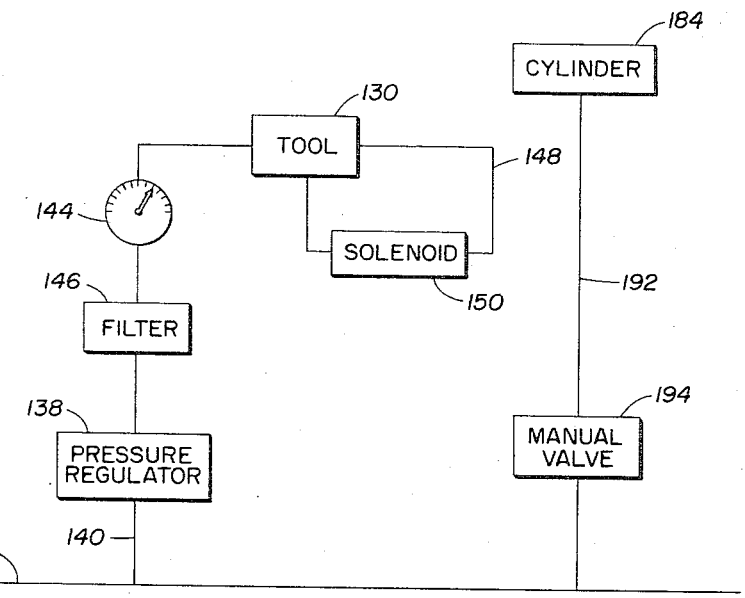
FIG. 9 is a schematic diagram of the air pressure supply system of the apparatus.

To control the solenoid valve 150 and thereby control driving of the fasteners into the work piece, I provide an electrical control system which is shown schematically in FIG. 8. The control system is supplied by a power source through a main switch 152. The line leading to the solenoid 150 contains a push button switch 154 which when depressed will energize the solenoid 150 thereby causing a fastener to be driven by the stapler 130. The push button switch 154 is utilized to drive single fasteners. However, where panels of an identical construction are to be made on a mass production basis, intermittently operating the switch 154 is too slow and inaccurate. To accomplish this more automatic operation, I provide two indexing mechanisms 156 and 158, the former controlling the driving of fasteners as the power fastener tool 130 travels along the beam 26 transversely to the work, while the indexing mechanism 158 controls as the carriage 24 is moved longitudinally along the work. Indexing mechanism 158 is mounted on a supporting beam 159 which is affixed at one end to beam 26 and at the other end to member 34. Indexing mechanism 156 is affixed at one end of beam 26. However, since the indexing mechanisms 156 and 158 function in an identical manner, I will therefore describe in detail only the mechanism 156, which is shown in FIGS. 6 and 7. The indexing mechanism 156 consists of a sprocket 160 turnably mounted on a supporting bracket 162 that is secured to the beam 26 in any suitable manner. The sprocket 160 is engageable with the chain 76 and therefore is turned as the crank 78 is rotated to move the carriage 80 along the beam 26. The sprocket 160 is provided with a predetermined pattern of projections 164. Several different sets of projections 164 can be provided on the sprocket 160, each set being on a different radius with the projections spaced at different intervals. A limit switch 166 having a roller-type trip arm 168 is mounted on the supporting bracket 162 with the trip arm 168 engageable with one set of projections 164. Thus, as sprocket 160 rotates, the limit switch 166 will be intermittently opened and closed at predetermined intervals. The limit switch 166 is adjustably positioned on a mounting bar 170 containing a series of indentations 172, and a spring-loaded pin 174 is positionable in any selected indentation to lock the limit switch 166 in a position aligned with the desired set of projections 164.

The indexing mechanism 158 has a similar sprocket 176 that is engageable with chain 68 and is thereby rotated as the main carriage 24 moves. Rotation of sprocket 176 causes a limit switch 178 to be similarly actuated according to the selected pattern of projections on the sprocket 176.

I prefer to provide in the control system schematically shown in FIG. 8 a switch 180 which when closed will permit the power fastener tool 130 to be operated automatically by the indexing mechanisms 156 and 158 as the main carriage 24 or carriage 80 is moved. When the switch 180 is open, the limit switches 166 and 178 are not activated, and therefore the power fastener tool 130 can be moved along the beam 26 or carriage 24 can be moved over the work without fasteners being driven. With this arrangement, the operator can place the work on the work table 10 and position the carriage 80 along the beam 26, then close switch 180 and turn crank 58 to move the main carriage 24 longitudinally. As carriage 24 moves with switch 180 closed, the sprocket 176 will repeatedly open and close the limit switch 178 to energize the solenoid 150 and drive the fasteners from the power fastener tool 130 into the work at spaced points along a longitudinal line.

Similarly, with the carriage 24 positioned along the work in the desired place, the switch 180 can be closed and the crank 78 turned to move the carriage 80 along the beam 26 and thereby drive fasteners into the work at spaced points along a transverse line.

Figure 10:
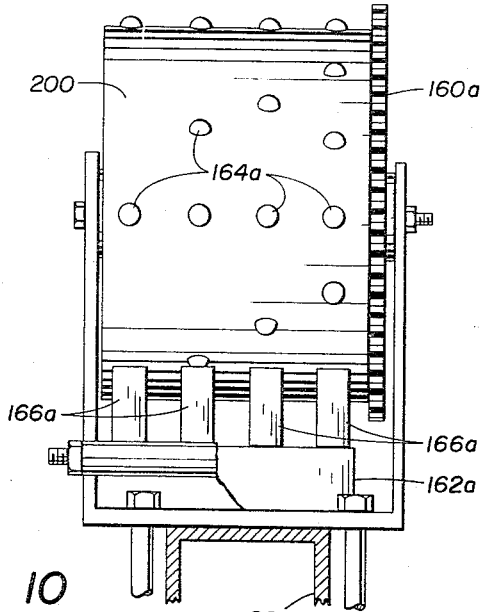
FIG. 10 is a modified embodiment of the power fastener tool actuating or indexing mechanism.

The particular construction of the indexing mechanisms 156 and 158 just described obviously can be modified and still carry out the same functions. One such modification I have illustrated in FIG. 10 in a second embodiment of indexing mechanism 156 with parts corresponding to those of the first embodiment being indicated by the same reference numerals followed by the letter "a." A sprocket 160a is mounted at one end of cross beam 26a and is driven as the carriage 80 is moved across the beam 26a similar to the first embodiment. However, sprocket 160a has a drum 200 affixed to one side thereof which drum has a plurality of projections 164a extending from its periphery. The projections 164a are in aligned spaced-apart rows around the drum 200, the projections 164a in each row being spaced according to a desired pattern. Mounted on a supporting bracket 162a are a plurality of limit switches 166a, each limit switch being positioned so that its trip arm (not shown) engages one of the rows of projections 164a as the drum revolves. The limit switches 166a are wired in the control circuit so that a selected one can be activated electrically thereby permitting the operator to select a particular pattern from his control position. Of course, the drum 200 can be used in combination with a single movable limit switch that is positionable to engage a selected row of projections as in the first embodiment. Other than the modifications just described, the indexing mechanism 156a functions in the same manner as that of the first embodiment.

To permit easy removal and replacement of the power fastener tool 130, I prefer to provide a connection such as socket 182, into which can be plugged the line 181 leading to the solenoid 150. This is particularly convenient for the type of stapler I have shown which has a self-contained solenoid valve.

In order to keep the air lines and electrical wires from interfering with the use of the apparatus, I prefer to provide and have shown in FIG. 1 conduits 183 and 185 through which these wires and air lines can be run to the carriage 80 and power fastener tool 130. As shown, the conduits 183 and 185 are pivotally connected together at one end. The other end of conduit 183 is pivotally connected to the outer end of beam 26 in any suitable manner while the other end of conduit 185 is pivotally connected to the carriage 80. The conduits 183 and 185 extend above beam 26 in an inverted V and do not interfere in any way with the movement of carriage 80 back and forth across the entire length of beam 26.

Since there may be times when it is desirable or necessary to raise the power fastener tool 130 in order to lift it over an obstruction on the work surface, I prefer to mount a small air cylinder 184 (FIG. 5) on the carriage 80 so that it is positioned on a line between the rod 116 and the supporting bracket 128. As best seen in FIG. 5, the piston rod 186 of the air cylinder 184 extends upwardly and when extended engages a cross member 188 affixed to the arms 126. Thus, when the piston rod 186 is extended, it will raise the arms 126 thereby lifting the rod 116 and the power fastener tool 130. The cylinder 184 is supplied with pressurized air by being connected in a branch air line 192 that is supplied from the main air line 136. A control valve 194 (FIG. 9) is provided in the line 192 so that operation of the cylinder can be controlled by the operator.

As is evident from the above description, my apparatus is very versatile and can be used to carry out a variety of operations. A single operator can easily and accurately control the entire operation of the apparatus. The power fastener tool can be positioned at any point within the work area and fasteners can be driven accurately in a pattern along any desired path.

Having thus described my invention, it will be obvious to those skilled in the art that various revisions and modifications can be made therein without departing from the spirit and scope of the invention. It is my intension, however, that any such revisions and modifications as are obvious to those skilled in the art will be included within the scope of the following claims.

I claim:

1. Apparatus for use in the prefabrication of modular panels or wall assemblies for buildings comprising: a supporting structure effective to support one such assembly disposed horizontally thereon with one of its surfaces upwardly facing, a tool carriage carried by said supporting structure, said carriage having a portion overlying said surface and being horizontally movable relative to said supporting structure in a first direction so that the overlying portion of said carriage traverses said surface during said carriage movement, means for moving said carriage as aforesaid, a fastener driving power tool of the intermittently operable type carried by the overlying portion of said carriage and adjustable therealong in a second direction transverse to said first direction to any one of a plurality of positions thereon, said tool being mounted effective to be supported upon said surface in fastener driving position and to be horizontally moved thereover by said carriage movement, said tool mounting permitting vertical floating movement of said tool relative to said carriage during said movement of said tool by said carriage over said surface, the portion of said tool engaging said surface and supporting said tool thereon being provided with means reducing friction between said portion and said surface during said tool movement thereover, tool lifting means for optionally and positively raising said tool out of said floating contact with said surface, said lifting means being controlled from a location remote from said tool, and actuating means associated with said supporting structure and said carriage effective to automatically produce intermittent fastener driving actuation of said tool at predetermined intervals over said surface during said movement of said carriage.

2. Apparatus according to claim 1 wherein said actuating means includes an electrical circuit for controlling said tool actuation, said circuit having circuit making and breaking means connected therein and activated during said carriage movement, said circuit means thereby actuating said tool.

3. Apparatus according to claim 2 including a member for activating said circuit making and breaking means during said carriage movement.

4. Apparatus for use in the prefabrication of modular panel or wall assemblies for buildings comprising: a supporting structure effective to support one such assembly disposed horizontally thereon with one of its surfaces upwardly facing, a main tool carriage carried by said supporting structure, said carriage having a portion overlying said surface and being horizontally movable relative to said supporting structure in a first direction, the overlying portion of said carriage traversing the entire area of said surface during said carriage movement, means for moving said carriage as aforesaid, an auxiliary tool carriage carried by the overlying portion of said main carriage and horizontally movable thereon relative thereto and independently of said main carriage over said surface in a second direction transverse to said first direction, means for moving said auxiliary carriage as aforesaid, a fastener driving power tool of the intermittently operable type mounted to said auxiliary carriage, said tool mounting being effective to support said tool upon said surface in fastener driving position and to horizontally move said tool over the entire area of said surface upon movement of both of said carriages, said tool mounting permitting vertical floating movement of said tool relative to said carriages during said movements of said tool by said carriages over said surface and including tool lifting means for optionally and positively raising said tool out of said contact with said surface, said lifting means being power operated and controlled from a location remote from said tool, the portion of said tool engaging said surface and supporting said tool thereon being provided with means reducing friction between said portion and said surface during said tool movement thereover, and actuating means associated with said supporting structure and said carriages effective to automatically produce intermittent fastener driving actuation of said tool at predetermined intervals over said surface during said movement of either of said carriages.

5. Apparatus according to claim 4 wherein said actuating means includes an electrical circuit for controlling said tool actuation, said circuit having a pair of switches connected therein, each of said switches being activated during said movement of a different one of said carriages and thereby actuating said tool.

6. Apparatus according to claim 5 including a pair of rotatable members, each of said rotatable members being driven coordinately with said movement of a different one of said carriages, each of said switches being mounted adjacent a different one of said rotatable members, each of said rotatable members being provided with means to intermittently actuate said switch adjacent thereto.

7. Apparatus according to claim 6 in which each of said rotatable members is provided with a plurality of different sets of means to actuate said switch adjacent thereto, each of said sets actuating said switch at different regular intervals.

8. Apparatus according to claim 7 in which a third switch is provided in said circuit, said third switch being located remote from said power tool and optionally manually operable in order to operate said power tool independently of said automatic actuating means.

References Cited by the Examiner
UNITED STATES PATENTS

| | | | |
|---|---|---|---|
| 498,721 | 5/1893 | McKay | 173—43 |
| 516,032 | 3/1894 | Symonds | 173—43 |
| 1,256,072 | 2/1918 | Stevenson | 77—6 |
| 2,788,194 | 4/1957 | Hale | 173—147 |
| 3,181,630 | 5/1965 | Coburn | 173—147 |
| 3,202,895 | 8/1965 | Arp et al. | 77—32.2 |
| 3,238,624 | 3/1966 | McCabe | 77—5 |

FRED C. MATTERN, Jr., *Primary Examiner.*

L. P. KESSLER, *Assistant Examiner.*